US008484396B2

(12) United States Patent
Bugge

(10) Patent No.: US 8,484,396 B2
(45) Date of Patent: Jul. 9, 2013

(54) METHOD AND SYSTEM FOR CONDITIONAL INTERRUPTS

(75) Inventor: Haakon Ording Bugge, Oslo (NO)

(73) Assignee: Oracle International Corporation, Redwood Shores, CA (US)

( * ) Notice: Subject to any disclaimer, the term of this patent is extended or adjusted under 35 U.S.C. 154(b) by 127 days.

(21) Appl. No.: 13/215,390

(22) Filed: Aug. 23, 2011

(65) Prior Publication Data

US 2013/0054858 A1    Feb. 28, 2013

(51) Int. Cl.
*G06F 12/00* (2006.01)
(52) U.S. Cl.
USPC ............ 710/240; 710/260; 370/242; 709/212
(58) Field of Classification Search
USPC .......... 710/240–244, 200, 260–269; 718/103; 709/212; 370/242
See application file for complete search history.

(56) References Cited

U.S. PATENT DOCUMENTS

| 6,988,268 | B2* | 1/2006 | Zuberi ........................ 718/103 |
| 7,953,085 | B2* | 5/2011 | Chang et al. ................. 370/390 |
| 8,023,417 | B2* | 9/2011 | Blackmore et al. ........... 370/242 |
| 8,244,826 | B2* | 8/2012 | Benner et al. ................. 709/212 |
| 8,364,849 | B2* | 1/2013 | Chaudhary et al. ........... 709/250 |
| 2009/0106771 | A1* | 4/2009 | Benner et al. ................. 719/313 |
| 2011/0106905 | A1* | 5/2011 | Frey et al. ..................... 709/212 |

OTHER PUBLICATIONS

Pfister, Gregory; "An Introduction to the Infiniband Architecture"; IBM Enterprise Server Group, Chapter 42, pp. 617-632 (2002).
Shanley, Tom; "Infiniband Network Architecture", MindShare, Inc., Chapter 1, pp. 9-24 (2003).
Shanley, Tom; "Infiniband Network Architecture", MindShare, Inc., Chapters 3-6, pp. 31-129 (2003).
Shanley, Tom; "Infiniband Network Architecture", MindShare, Inc., Chapter 13, pp. 259-289 (2003).

* cited by examiner

*Primary Examiner* — Brian Misiura
*Assistant Examiner* — Kim Huynh
(74) *Attorney, Agent, or Firm* — Osha Liang LLP

(57) ABSTRACT

A method for issuing interrupts includes a receiving communication adapter receiving a first remote directed memory access (RDMA) write with immediate, identifying a completion queue descriptor corresponding to the first RDMA write with immediate and to a receiving entity, incrementing an interrupt counter in response to the first RDMA write with immediate. The method includes storing, by the receiving communication adapter, in response to determining that the interrupt counter value is less than the interrupt threshold value, data in the first RDMA write with immediate on the receiving device without triggering an interrupt to the receiving entity. The receiving communication adapter receives a second RDMA write with immediate, and increments the interrupt counter value corresponding to the completion queue descriptor in response to the second RDMA write with immediate. The method includes triggering the interrupt to the receiving entity in response to the interrupt counter value exceeding the interrupt threshold.

20 Claims, 5 Drawing Sheets

METHOD AND SYSTEM FOR CONDITIONAL INTERRUPTS

BACKGROUND

Computer communications systems are a collection of computer systems that communicate via a network. Specifically, for any particular communication, one computer system is a sending system while another computer system is a receiving system. In other words, the sending system sends the message to the receiving system. On the receiving system, when a new message is received, the receiving system sends an interrupt to the application executing on the receiving system to which the message is directed. The interrupt notifies the application that the new message is received and is ready to be processed. If the single message includes multiple packets, then the interrupt is sent after the last packet of the message.

SUMMARY

In general, in one aspect, the invention relates to a method for issuing interrupts. The method includes a receiving communication adapter receiving a first remote directed memory access (RDMA) write with immediate from a first producer via a network, identifying a completion queue descriptor corresponding to the first RDMA write with immediate and to a receiving entity executing on a receiving device, incrementing an interrupt counter value corresponding to the completion queue descriptor in response to the first RDMA write with immediate. The method further includes determining, after incrementing in response to the first RDMA write with immediate, that the interrupt counter value is less than a interrupt threshold value, storing, by the receiving communication adapter, in response to the determination that the interrupt counter value is less than the interrupt threshold value, data in the first RDMA write with immediate on the receiving device without triggering an interrupt to the receiving entity. The receiving communication adapter further receives a second RDMA write with immediate from a second producer via the network, and increments the interrupt counter value corresponding to the completion queue descriptor in response to the second RDMA write with immediate. The method further includes detecting, after incrementing in response to the second RDMA write with immediate, that the interrupt counter value exceeds the interrupt threshold value, and triggering the interrupt to the receiving entity in response to the interrupt counter value exceeding the interrupt threshold value. The receiving entity processes the first RDMA write with immediate and the second RDMA write with immediate in response to the interrupt.

In general, in one aspect, the invention relates to a system for issuing interrupts. The system includes a receiving device that includes a receiving entity, and an interrupt handler. The system further includes a receiving communication adapter. The receiving communication adapter includes a network port connected to a network, and an interrupt triggering module connected to the network port. The interrupt triggering module includes functionality to receive, from the network port, a first remote directed memory access (RDMA) write with immediate from a first producer via the network, identify a completion queue descriptor corresponding to the first RDMA write with immediate and to the receiving entity, increment an interrupt counter value corresponding to the completion queue descriptor in response to the first RDMA write with immediate, determine, after incrementing in response to the first RDMA write with immediate, that the interrupt counter value is less than an interrupt threshold value, and store in response to the determination that the interrupt counter value is less than the interrupt threshold value, data in the first RDMA write with immediate on the receiving device without triggering an interrupt to the receiving entity. The interrupt triggering module is further configured to receive a second RDMA write with immediate from a second producer via the network, increment the interrupt counter value corresponding to the completion queue descriptor in response to the second RDMA write with immediate, detect, after incrementing in response to the second RDMA write with immediate, that the interrupt counter value exceeds the interrupt threshold value, and trigger, using the interrupt handler, the interrupt to the receiving entity in response to the interrupt counter value exceeding the interrupt threshold value. The receiving entity processes the first RDMA write with immediate and the second RDMA write with immediate in response to the interrupt.

In general, in one aspect, the invention relates to a host channel adapter that includes a network port connected to a network, a packet receiver module connected to the network port. The packet receiver module is configured to receive a first RDMA write with immediate from a first producer via the network port and the network, and a second RDMA write with immediate from a second producer via the network port and the network. The host channel adapter further includes a descriptor fetch module connected to the packet receiver module and configured to identify a completion queue descriptor corresponding to the first RDMA write with immediate and to a receiving entity executing on a receiving device, increment an interrupt counter value corresponding to the completion queue descriptor in response to the first RDMA write with immediate, determine that the interrupt counter value is less than an interrupt threshold value, increment the interrupt counter value corresponding to the completion queue descriptor in response to the second RDMA write with immediate, detect, after incrementing in response to the second RDMA write with immediate, that the interrupt counter value exceeds the interrupt threshold value, and trigger the interrupt to the receiving entity in response to the interrupt counter value exceeding the interrupt threshold value. The receiving entity processes the first RDMA write with immediate and the second RDMA write with immediate in response to the interrupt.

Other aspects of the invention will be apparent from the following description and the appended claims.

DETAILED DESCRIPTION

Figure 1:
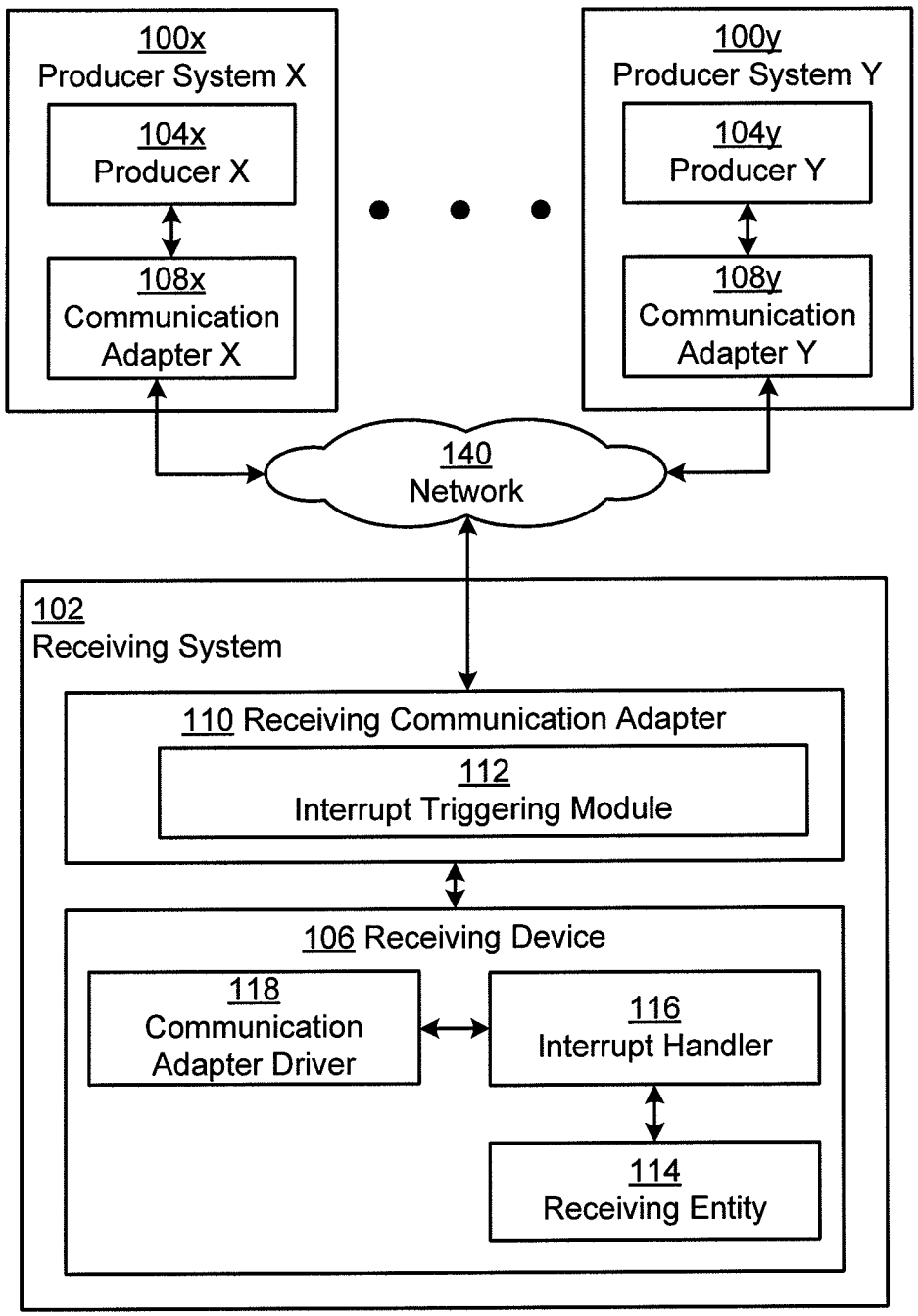
FIGS. 1-2 show a schematic diagram of a system in one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for limiting a number of interrupts to a receiving entity located on a receiving device. Specifically, the receiving device is connected to a receiving communication adapter. When the receiving communication adapter receives a new communication, the receiving communication adapter performs steps for limiting the number of interrupts to the receiving entity. In one or more embodiments of the invention, the new communication may be remote direct memory access (RDMA) write with immediate or send with immediate. In one or more embodiments of the invention, the use of the term "message" refer to communications sent using send with immediate.

For example, for RDMA writes with immediate, the receiving communication adapter may identify a completion queue descriptor corresponding to the RDMA write with immediate. The receiving communication adapter increments an interrupt counter value corresponding to the completion queue descriptor in response to the RDMA write with immediate. The completion queue descriptor also corresponds to the receiving entity. The interrupt is triggered only when the interrupt counter value is greater than a threshold. Thus, for RDMA writes with immediate, embodiments of the invention only trigger an interrupt after more than a threshold number of RDMA writes with immediate are received.

By way of another example, upon receiving a message, the receiving communication adapter may determine whether the completion queue corresponding to the message transitioned from a state of empty to non-empty. The empty state is when there were no messages waiting to be processed by the receiving entity. The non-empty state is when messages are waiting to be processed by the receiving entity. If the completion queue corresponding to the message transitions from a state of empty to non-empty, then an interrupt is triggered to the receiving entity. The interrupt allows the receiving entity to start processing messages.

FIG. 1 shows a schematic diagram of a communication system in one or more embodiments of the invention. In one or more embodiments of the invention, the communication system includes one or more producer systems (e.g., producer system X (100x), producer system Y (100Y)) and a receiving system (102). The producer system (e.g., producer system X (100x), producer system Y (100Y)) and receiving system (102) may be any type of physical computing device connected to a network (140). The network may be any type of network, such as an Infiniband® network, a local area network, a wide area network (e.g., Internet), or any other network now known or later developed. By way of an example of the producer system (e.g., producer system X (100x), producer system Y (100Y)) and the receiving system (102), the producer system (e.g., producer system X (100x), producer system Y (100Y)) and/or a receiving system (102) may be a host system, a storage device, or any other type of computing system.

In one or more embodiments of the invention, for a particular message, the producer system (e.g., producer system X (100x), producer system Y (100Y)) is a system that sends the message and/or an RDMA write with immediate and the receiving system (102) is a system that receives the message and/or the RDMA write with immediate. In other words, the use of the words, "producer" and "receiving", refers to the roles of the respective systems for a particular message. The roles may be reversed for another message, such as a response sent from receiving system (102) to one or both of the producer systems (e.g., producer system X (100x), producer system Y (100Y)). For such a message, the receiving system (102) is a producer system and the producer system (e.g., producer system X (100x), producer system Y (100Y)) is a receiving system. Thus, communication may be bi-directional in one or more embodiments of the invention.

In one or more embodiments of the invention, the producer system (e.g., producer system X (100x), producer system Y (100Y)) and receiving system (102) includes a device (e.g., producer device X (10), producer device Y (104Y), receiving device (106)) and a communication adapter (e.g., communication adapter X (108x), communication adapter Y (108Y), receiving communication adapter (110)). The device and the communication adapter are discussed below.

In one or more embodiments of the invention, the device (e.g., producer device X (10), producer device Y (104Y), receiving device (106)) includes at least a minimum amount of hardware necessary to process instructions. For example the device may include hardware, such as a central processing unit ("CPU"), memory, and a root complex. In one or more embodiments of the invention, the CPU is a hardware processor component for processing instructions of the device. The CPU may include multiple hardware processors. Alternatively or additionally, each hardware processor may include multiple processing cores in one or more embodiments of the invention. In general, the CPU is any physical component configured to execute instructions on the device.

In one or more embodiments of the invention, the memory is any type of physical hardware component for storage of data. In one or more embodiments of the invention, the memory may be partitioned into separate spaces for virtual machines In one or more embodiments, the memory further includes a payload for transmitting on the network (140) or received from the network (140) and consumed by the CPU.

Continuing with FIG. 1, in one or more embodiments of the invention, the communication adapter (e.g., communication adapter X (108x), communication adapter Y (108Y), receiving communication adapter (110)) is a physical hardware component configured to connect the corresponding device to the network (140). Specifically, the communication adapter is a hardware interface component between the corresponding device and the network. In one or more embodiments of the invention, the communication adapter is connected to the corresponding device using a peripheral component interconnect (PCI) express connection or another connection mechanism. For example, the communication adapter may correspond to a network interface card, an Infiniband® channel adapter (e.g., target channel adapter, host channel adapter), or any other interface component for connecting the device to the network.

In one or more embodiments of the invention, communication such as send and RDMA writes with immediate are performed using queue pairs (not shown) and completion queues (not shown). A queue pair includes a send queue and a receive queue. Each send queue has a corresponding receive queue and each receive queue has a corresponding send queue. When a producer executing on the producer device sends a communication to the receiver, the producer posts the communication to the send queue on the producer device. The producer communication adapter processes communications posted to the send queue by transmitting the communication to the receiving communication adapter. The received communications are posted to the corresponding receive queue.

In addition to queue pairs, the receiving communication adapter may include a completion queue for each receiving entity (114) (discussed below). The completion queue provides a mechanism for storing status information about communications received. For example, the completion queue may include the communication or an identifier of the communication (e.g., a receive queue identifier and sequence number, location of the communication in memory, or other information).

In one or more embodiments of the invention, the completion queue may be set in conditional interrupt mode. In the conditional interrupt mode, the immediate data is not written to the completion queue. Rather, the immediate data is used to execute a conditional interrupt algorithm. In one or more embodiments of the invention, the execution of the conditional interrupt algorithm triggers whether to perform a conditional interrupt. For example, in one or more embodiments of the invention, the conditional interrupt algorithm may specify to perform a fetch and add operation in a location in memory that stores an interrupt counter value to obtain a result that is used to determine whether to issue an interrupt.

A completion queue descriptor includes information about the status of the completion queue. For example, the completion queue descriptor may include multiple fields. The fields may include the number of communications received, the serial number of the last communication received to the corresponding receive queue and an interrupt threshold value. In one or more embodiments of the invention, the interrupt threshold value specifies a number of RDMA writes with immediate to receive before issuing an interrupt. In one or more embodiments of the invention, the interrupt threshold value is configurable on a per completion queue basis. Additionally, in one or more embodiments of the invention, a field of the completion queue descriptor may include an interrupt counter value or specify a location in memory that stores the interrupt counter value. The interrupt counter value is a number of RDMA writes with immediate received since the last interrupt was issued to the receiving entity (114).

Continuing with FIG. 1, in one or more embodiments of the invention, the receiving communication adapter (110) includes an interrupt triggering module (112). In one or more embodiments of the invention, the interrupt triggering module corresponds to hardware and/or software logic that includes functionality to initiate triggering an interrupt of the receiving entity (114). For example, the interrupt triggering module (112) includes functionality to indirectly trigger an interrupt upon the existence of a condition. Specifically, the interrupt triggering module (112) includes functionality to trigger an interrupt.

For example, the condition may be the transition of the completion queue from the empty to non-empty state and/or the existence of the interrupt counter value being greater than an interrupt threshold value. In one or more embodiments of the invention, the interrupt triggering module (112) includes functionality to detect the presence of the condition. Alternatively or additionally, the interrupt triggering module (112) includes functionality to cause the existence of the condition. For example, the interrupt triggering module may include functionality to perform a fetch and add operation on the location in memory storing the interrupt counter value. In the example, the fetch and add operation may increase the interrupt counter value to a value greater than the interrupt threshold.

In one or more embodiments of the invention, the interrupt handler (116) corresponds to software. The interrupt handler (116) may functionality to process an interrupt and/or to detect the presence of a condition to trigger an interrupt and trigger an interrupt. For example, the interrupt handler (116) may include functionality to receive an interrupt from the interrupt triggering module (112). Alternatively, the interrupt handler (116) may include functionality to detect that the interrupt counter value is greater than the interrupt threshold value.

In one or more embodiments of the invention, a communication adapter driver (118) is interposed between the interrupt handler (116) and the interrupt triggering module (112). The communication adapter driver (118) is configured to translate communications, such as commands and interrupts, between the receiving communication adapter (110) and components of the receiving device (106).

Continuing with FIG. 1, the receiving entity (114) may be software and/or hardware on the network that receives and processes the message. Specifically, the receiving entity (114) is a component that includes functionality to perform the final processing of the message. For example, the receiving entity may correspond to a hardware component of the receiving device (106), an application executing on the CPU, or any other entity receiving the message.

Although not shown in FIG. 1, in one or more embodiments of the invention, software instructions to perform embodiments of the invention may be stored on a computer readable medium such as a compact disc (CD), a diskette, a tape, a file, or any other non-transitory computer readable storage device.

Figure 2:
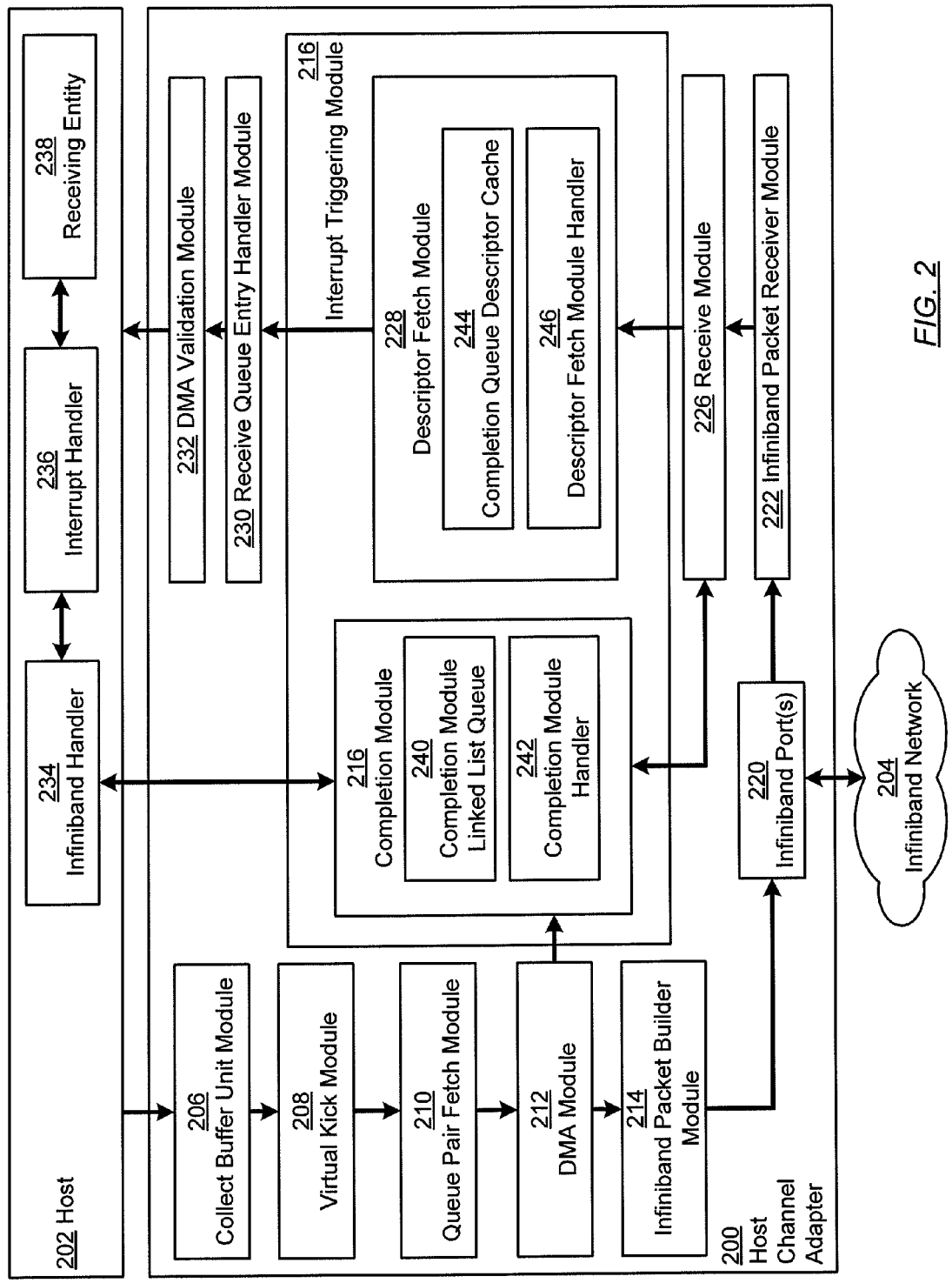

FIG. 2 shows a schematic diagram of the receiving system when the network is an Infiniband® network in one or more embodiments of the invention. As shown in FIG. 2, the receiving device is a host (202). The host (202) corresponds to any type of device connected to the Infiniband® network (204). The host (202) includes an Infiniband® handler (234), an interrupt handler (236), and a receiving entity (238). The interrupt handler (236) and receiving entity (238) includes similar functionality as the interrupt handler (116) and receiving entity (114), respectively, shown in FIG. 1. The Infiniband® handler (234) includes functionality to direct communications, such as interrupts and notifications, from the host channel adapter (200) to the host (202). In particular, the Infiniband® handler (234) may include functionality of an Infiniband® device driver and/or additional functionality to manage communication between the host (202) and the host channel adapter (200).

Continuing with FIG. 2, the communication adapter connected to the host (202) for the Infiniband® network is a host channel adapter (200). The host channel adapter (200) may include a collect buffer unit module (206), a virtual kick module (208), a queue pair fetch module (210), a direct memory access (DMA) module (212), an Infiniband® packet builder module (214), one or more Infiniband® ports (220), a completion module (216), an Infiniband® packet receiver module (222), a receive module (226), a descriptor fetch module (228), a receive queue entry handler module (230), and a DMA validation module (232). Each of these components is discussed below.

In one or more embodiments of the invention, each module may correspond to hardware and/or firmware. Each module is configured to process data units. Each data unit corresponds to a command or a received message or packet. For example, a data unit may be the command, an address of a location on the communication adapter storing the command, a portion of a message corresponding to the command, a packet, an identifier of a packet, an RDMA write with immediate, or any other identifier corresponding to a command, a portion of a command, a message, RDMA, write, or a portion of a message.

The dark arrows between modules show the transmission path of data units between modules as part of processing commands and received messages in one or more embodiments of the invention. Data units may have other transmission paths (not shown) without departing from the invention. Further, other communication channels and/or additional components of the host channel adapter (200) may exist without departing from the invention. Each of the components of the resource pool is discussed below.

The collect buffer unit module (206) includes functionality to receive command data from the host and store the command data on the host channel adapter. Specifically, the collect buffer unit module (206) is connected to the host and configured to receive the command from the host and store the command in a buffer. When the command is received, the collect buffer unit module is configured to issue a kick that indicates that the command is received.

In one or more embodiments of the invention, the virtual kick module (208) includes functionality to load balance commands received from applications. Specifically, the virtual kick module is configured to initiate execution of commands through the remainder of the receiving entity processing logic in accordance with a load balancing protocol.

In one or more embodiments of the invention, the queue pair fetch module (210) includes functionality to obtain queue pair status information for the queue pair corresponding to the packet. Specifically, per the Infiniband® protocol, the message has a corresponding send queue and a receive queue. The send queue and receive queue form a queue pair. Accordingly, the queue pair corresponding to the message is the queue pair corresponding to the packet in one or more embodiments of the invention. The queue pair state information may include, for example, sequence number, address of remote receive queue/send queue, whether the queue pair is allowed to send or allowed to receive, and other state information.

In one or more embodiments of the invention, the DMA module (212) includes functionality to perform DMA with the host memory. The DMA module may include functionality to determine whether a command in a packet or referenced by a packet identifies a location in host memory that includes payload. The DMA module may further include functionality to validate that the process sending the command has necessary permissions to access the location, and to obtain the payload from the host memory, and store the payload in the DMA memory. Specifically, the DMA memory corresponds to a storage unit for storing a payload obtained using DMA.

Continuing with FIG. 2, in one or more embodiments of the invention, the DMA module (212) is connected to an Infiniband® packet builder module (214). In one or more embodiments of the invention, the Infiniband® packet builder module includes functionality to generate one or more packets for each packet and to initiate transmission of the one or more packets on the Infiniband® network (204) via the Infiniband® port(s) (220). In one or more embodiments of the invention, the Infiniband® packet builder module may include functionality to obtain the payload from a buffer corresponding to the packet, from the host memory, and from an embedded processor subsystem memory.

In one or more embodiments of the invention, the completion module (216) includes functionality to determine when packets are successfully sent or the last packet is successfully received. The completion module includes a completion module linked list queue (240) and a completion module handler (242).

The completion module linked list queue (240) corresponds to logic and memory for storing data units corresponding to packets waiting for an acknowledgement and data units corresponding to received packets. The completion module handler (242) corresponds to logic for performing the functions of the completion module. With regards to outbound packets (i.e., packets transmitted from the host to the Infiniband® network (204)), the completion module handler (242) includes functionality to manage packets for queue pairs set in reliable transmission mode. Specifically, in one or more embodiments of the invention, when a queue pair is in a reliable transmission mode, then the receiving channel adapter of a new packet responds to the new packet with an acknowledgement message indicating that transmission completed or an error message indicating that transmission failed. Thus, the completion module handler (242) includes functionality to manage data units corresponding to packets until an acknowledgement is received or transmission is deemed to have failed (e.g., by a timeout).

With regards to incoming packets and the corresponding messages, the completion module handler (242) includes functionality to track incoming messages in one or more embodiments of the invention. Specifically, the completion module handler (242) may include functionality to identify a complete queue corresponding to the receiving entity and determine whether the completion queue transitions from empty to non-empty state. Alternatively or additionally, the completion module may include functionality to perform a fetch and add operation on a location in memory storing an interrupt counter value in memory. The completion module handler (242) further includes functionality to trigger the interrupt handler (236) to trigger an interrupt in one or more embodiments of the invention.

Continuing with FIG. 2, in one or more embodiments of the invention, the Infiniband® packet receiver module (222) includes functionality to receive packets from the Infiniband® port(s) (220). In one or more embodiments of the invention, the Infiniband® packet receiver module (222) includes functionality to perform a checksum to verify that the packet is correct, parse the headers of the received packets, and place the payload of the packet in memory. In one or more embodiments of the invention, the Infiniband® packet receiver module (222) includes functionality to obtain the queue pair state for each packet from a queue pair state cache. In one or more embodiments of the invention, the Infiniband® packet receiver module includes functionality to transmit a packet for each packet to the receive module (226) for further processing.

In one or more embodiments of the invention, the receive module (226) includes functionality to validate the queue pair state obtained for the packet. The receive module (226) includes functionality to determine whether the packet should be accepted for processing. In one or more embodiments of the invention, if the packet corresponds to an acknowledgement or an error message for a packet sent by the host channel adapter (200), the receive module includes functionality to update the completion module (216).

Additionally or alternatively, the receive module (226) includes a queue that includes functionality to store packets waiting for one or more references to buffer location(s) or waiting for transmission to a next module. Specifically, when a process in a virtual machine is waiting for data associated with a queue pair, the process may create receive queue entries that reference one or more buffer locations in host memory in one or more embodiments of the invention. For each packet in the receive module hardware linked list queue, the receive module includes functionality to identify the receive queue entries from a host channel adapter cache or from host memory, and associate the identifiers of the receive queue entries with the packet.

In one or more embodiments of the invention, the descriptor fetch module (228) includes functionality to obtain descriptors for processing a packet. For example, the descriptor fetch module (228) may include functionality to obtain descriptors for a receive queue, a shared receive queue, a ring buffer, and the completion queue (i.e., completion queue descriptor).

The descriptor fetch module (228) may include a completion queue descriptor cache (244) and a descriptor fetch module handler (246). The completion queue descriptor cache (244) corresponds to logic and memory for storing completion queue descriptors for at least a portion of completion queues. In one or more embodiments of the invention, the completion queue descriptor includes an interrupt counter value field. The interrupt counter value field includes functionality to store the interrupt counter value or an address in memory having the interrupt counter value.

The descriptor fetch module handler (246) includes functionality to determine that a received communication is an RDMA write with immediate and to update the interrupt counter value based on the received RDMA write with immediate. In one or more embodiments of the invention, the descriptor fetch module handler (246) may include functionality to perform a local add operation on the interrupt counter value field and/or perform a fetch and add operation on a location in memory storing the interrupt counter value as specified by the interrupt counter value field.

In one or more embodiments of the invention, the descriptor fetch module handler (246) further includes functionality to determine whether the interrupt counter value is greater than the interrupt threshold value. The descriptor fetch module includes functionality to send a notification or interrupt to the interrupt handler (236) when the interrupt counter value is greater than the interrupt threshold value.

In one or more embodiments of the invention, the receive queue entry handler module (230) includes functionality to obtain the contents of the receive queue entries. In one or more embodiments of the invention, the receive queue entry handler module (230) includes functionality to identify the location of the receive queue entry corresponding to the packet and obtain the buffer references in the receive queue entry. In one or more embodiments of the invention, the receive queue entry may be located on a cache of the host channel adapter (200) or in host memory.

In one or more embodiments of the invention, the DMA validation module (232) includes functionality to perform DMA validation and initiate DMA between the host channel adapter and the host memory. The DMA validation module includes functionality to confirm that the remote process that sent the packet has permission to write to the buffer(s) referenced by the buffer references, and confirm that the address and the size of the buffer(s) match the address and size of the memory region referenced in the packet. Further, in one or more embodiments of the invention, the DMA validation module (232) includes functionality to initiate DMA with host memory when the DMA is validated.

Figure 3:
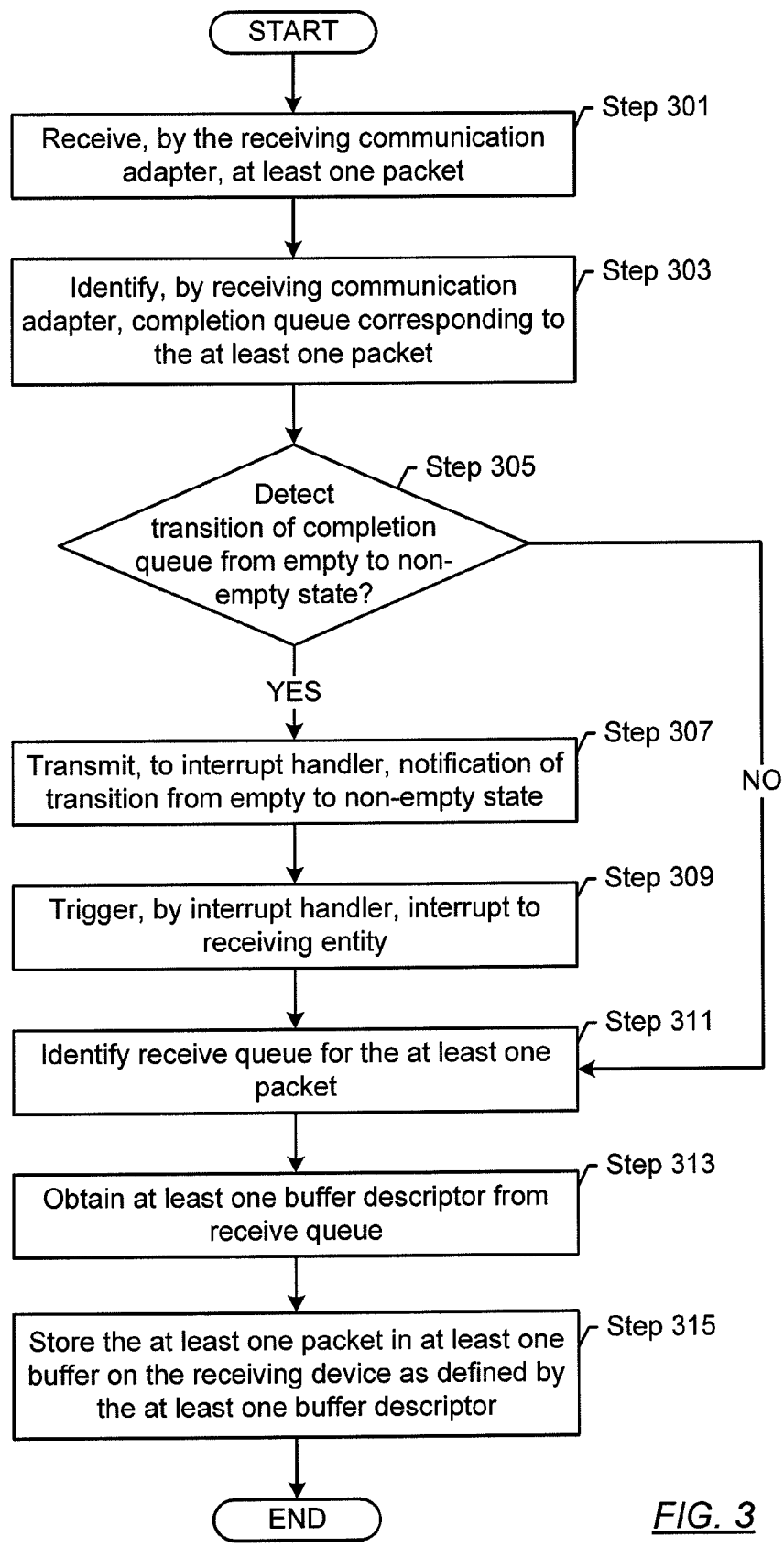
FIGS. 3-4 shows a flowchart in one or more embodiments of the invention.
Figure 4:
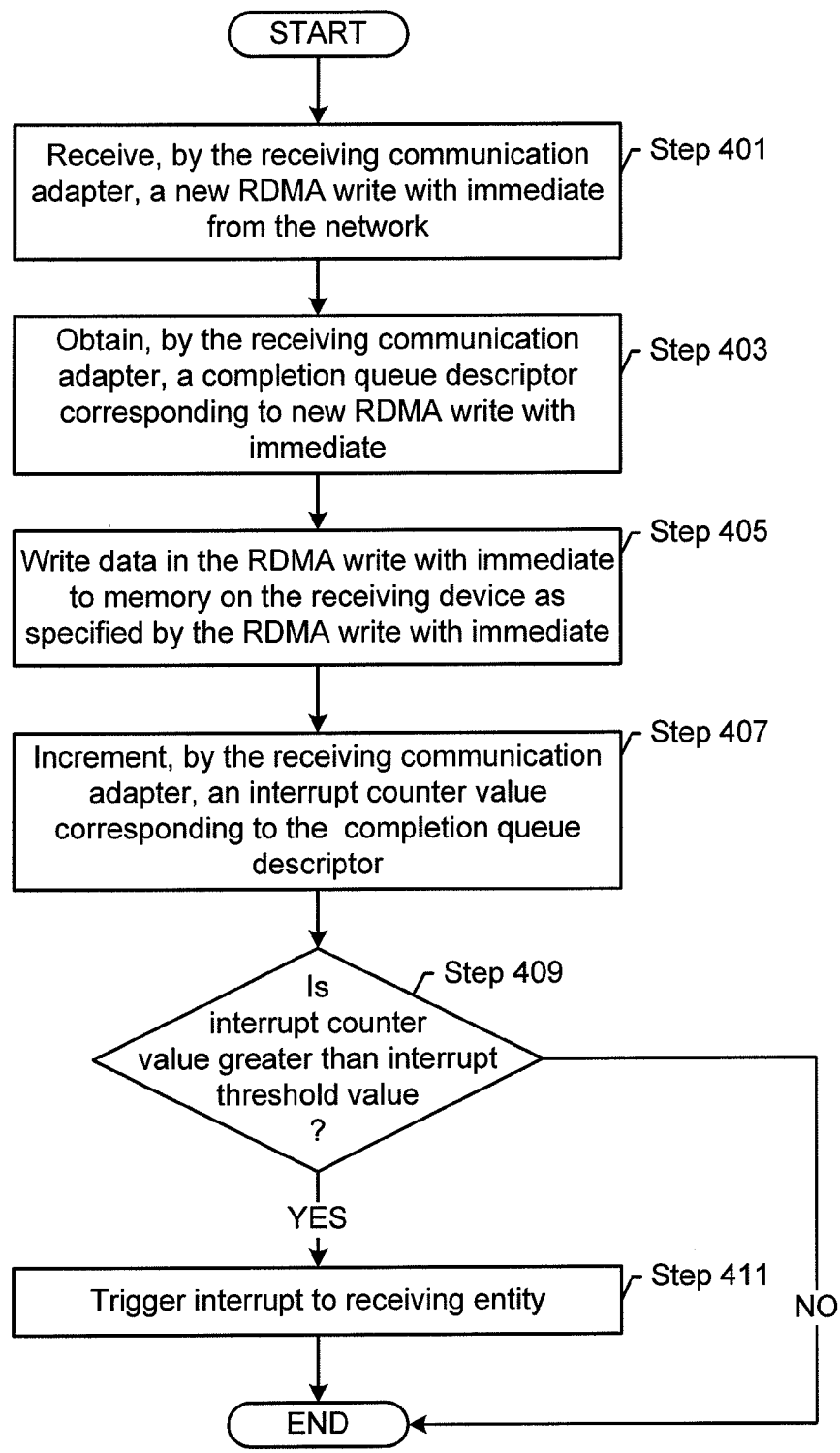

FIGS. 3-4 show flowcharts in accordance with one or more embodiments of the invention. While the various steps in these flowcharts are presented and described sequentially, some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that the condition exists in accordance with one or more embodiments of the invention. As another example, determination steps may be performed by performing a test, such as checking a data value to test whether the value is consistent with the tested condition in accordance with one or more embodiments of the invention.

FIG. 3 shows a flowchart for receiving a message in one or more embodiments of the invention. In Step 301, the receiving communication adapter receives at least one packet. In particular, a producer may send a message having one or more packets to the receiving system. In one or more embodiments of the invention, the packet received in Step 301 may be the first, last and/or any of the intermediary packets in the message.

In Step 303, the receiving communication adapter identifies the completion queue corresponding to the at least one packet. To identify the completion queue, the receiving communication adapter may use information in the at least one packet. For example, the packet may include an identifier of a receive queue and/or an identifier of the completion queue. The identifier of the receive queue may be used to identify the receiving entity and, thus, the completion queue corresponding to the receiving entity.

In Step 305, a determination is made whether the receiving communication adapter detects a transition of the completion queue from empty state to non-empty state. Specifically, the receiving communication adapter may check the completion queue to determine whether the completion queue includes packets without the addition of the at least one packet received in Step 301. If the completion queue previously included packets, then the completion queue did not transition from empty to non-empty state. However, if the completion queue did not include packets prior to the addition of the new packets, then the receiving communication adapter detects a transition from empty to non-empty state.

In Step 307, in response to detecting the transition, the receiving communication adapter transmits a notification to the interrupt handler of the transition from empty to non-empty state. Further, in Step 309, the interrupt handler triggers an interrupt to the receiving entity. The combination of Steps 305, 307, and 309 limit the number of interrupts that the receiving entity receives and that the interrupt handler processes. Specifically, by limiting the notification to the interrupt handler, the interrupt handler only interrupts the receiving entity for new messages when the receiving entity is not already processing messages. Thus, the receiving entity does not have to process the interrupts for each message as well as each message. Similarly, the interrupt handler does not have to process a notification from the receiving communication adapter for each message received. Rather, the receiving entity continues to process from the completion queue until the completion queue transitions to empty state.

Continuing with FIG. 3, regardless of whether the completion queue transitioned from empty to non-empty state, the receive queue for the at least packet is identified in Step 311. As discussed above, in one or more embodiments of the invention, the receive queue is specified in the packet.

In Step 313, at least one buffer descriptor is obtained from the receive queue. The buffer descriptor defines a location in memory to store the at least packet. Accordingly, in Step 315, the at least one packet is stored in a buffer on the receiving device as defined by the at least one buffer descriptor. At this stage, the receiving entity may process the packet from the at least one buffer.

FIG. 4 shows a flowchart for processing an RDMA write with immediate in one or more embodiments of the invention. In Step 401, the receiving communication adapter receives a new RDMA write with immediate from the network. Specifically, a producer may send a request to the receiving communication adapter to write data to memory of the receiving device. The RDMA write with immediate includes the location in the memory for writing the data.

In Step 403, the receiving communication adapter obtains a completion queue descriptor corresponding to the new RDMA write with immediate. Obtaining the completion queue descriptor may be performed using the queue pair specified in the RDMA write with immediate.

In Step 405, data in the RDMA write with immediate is written to memory as specified by the RDMA write with immediate. Specifically, the data is written to the location in memory specified by the RDMA write with immediate.

In Step 407, the receiving communication adapter increments the interrupt counter value corresponding to the completion queue descriptor. For example, the receiving communication adapter may perform a fetch and add operation on a memory location storing the interrupt counter value as specified by the completion queue descriptor. Alternatively, incrementing the interrupt counter value may be performed by performing a local add operation on the completion queue descriptor to increment the field of the completion queue descriptor storing the interrupt counter value.

In Step 409, a determination is made whether the interrupt counter value is greater than the threshold value. If the interrupt counter value is greater than the threshold value, then an interrupt is triggered to the receiving entity in Step 411. Specifically, the interrupt handler initiates the receiving entity to perform any processing of the RDMA write(s) with immediate.

Returning to Step 409, the determination may be performed by the receiving communication adapter. Specifically, after incrementing the interrupt counter value, the receiving communication adapter may compare the interrupt counter value with the interrupt threshold value. The interrupt threshold value may be in the completion queue descriptor, as part of a configurable parameter stored on the receiving communication adapter, or stored in another location. In one or more embodiments of the invention, if the receiving communication adapter performs the determination of Step 409, then the receiving communication adapter may trigger the interrupt handler to interrupt the receiving entity. In one or more embodiments of the invention, triggering the interrupt handler may include sending a notification to the interrupt handler. The notification causes the interrupt handler to trigger the interrupt to the receiving entity.

Alternatively or additionally, in one or more embodiments of the invention, the interrupt handler may perform the determination of Step 409. In such a scenario, the interrupt handler may read the incremented interrupt counter value with each RDMA write with immediate. Because the receiving communication adapter increments the interrupt counter value, after the new RDMA write with immediate is received, the interrupt handler can read the interrupt counter value and determine whether to trigger an interrupt.

The use of the interrupt counter value allows the receiving entity to only receive interrupts after a specified number of RDMA writes with immediate. By limiting the number of interrupts, the receiving entity is not unduly burdened by the processing of interrupts. Moreover, the receiving entity may have multiple RDMA writes with immediate by multiple producers. Each of the multiple producers may be completely unaware of the other producers. However, the interrupt mechanism in FIG. 4 creates only a single interrupt when the aggregate number of the RDMA writes with immediate is greater than the interrupt threshold value, regardless of the combination by which the RDMA write with immediate producers generate the interrupts.

Figure 5:
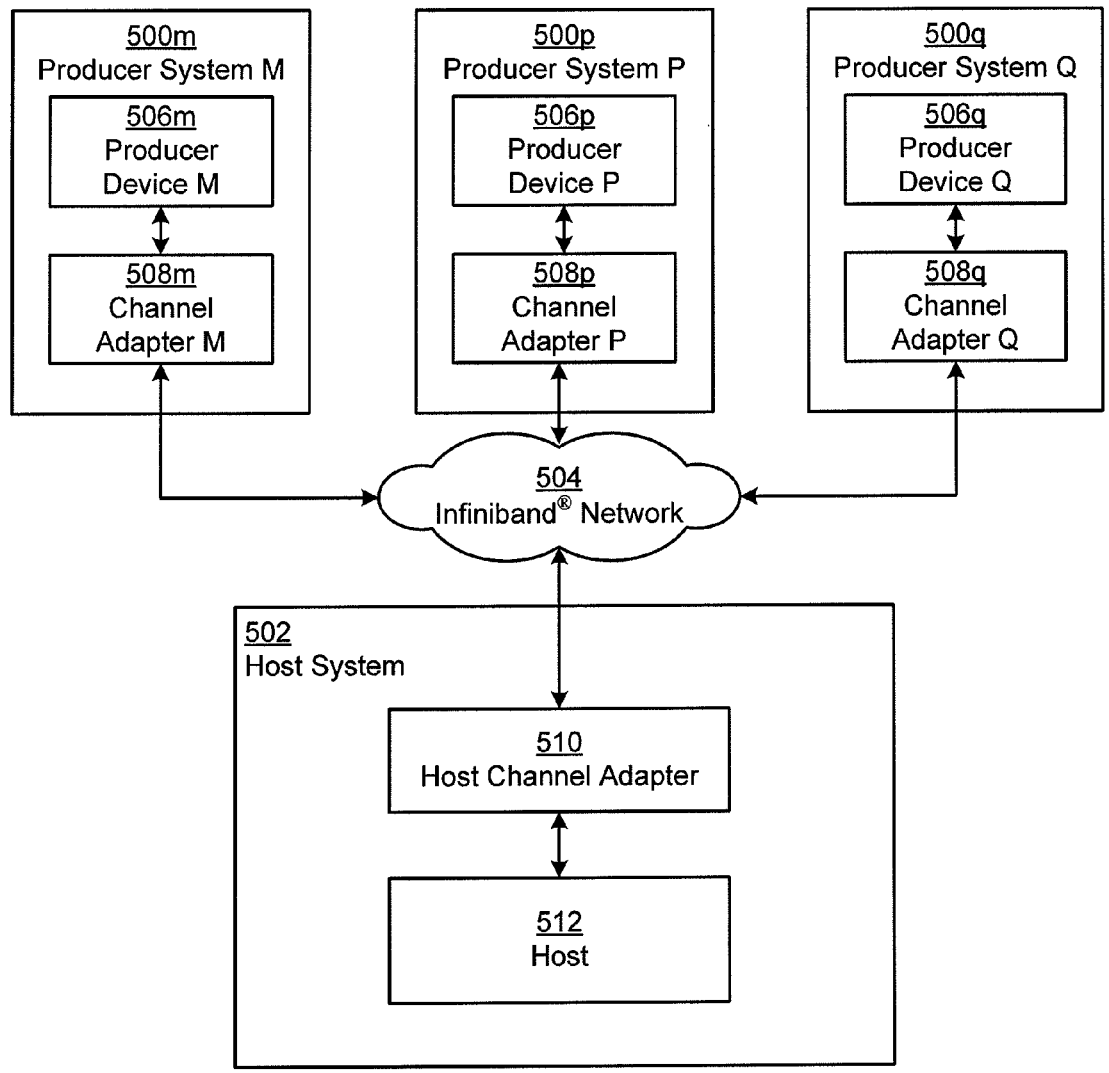
FIG. 5 shows an example in accordance with one or more embodiments of the invention.

FIG. 5 shows an example in one or more embodiments of the invention. The following example is for explanatory purposes only and not intended to limit the scope of the invention. As shown in FIG. 5, consider the scenario in which 3 producer systems (e.g., producer system M (500m), producer system P (500p), producer system Q (500q)) and a host system (502) are connected to an Infiniband® network (504). Each producer system (e.g., producer system M (500m), producer system P (500p), producer system Q (500q)) includes a producer device (e.g., producer device M (506m), producer device P (506p), producer device Q (506q)) and a channel adapter (e.g., channel adapter M (508m), channel adapter P (508p), channel adapter Q (508q)). The host system (502) includes a host channel adapter (510) and a host (512).

Continuing with the example, consider the scenario in which the host system (502) is a database server. The host channel adapter (510) is configured such that an interrupt is triggered to the receiving entity (not shown) to process the RDMA writes with immediate to the database server only after two hundred RDMA writes with immediate are received. Further, in the example, the producer devices (e.g., producer device M (506m), producer device P (506p), producer device Q (506q)) and, subsequently, producers (not shown) executing on the producer devices, are not aware of each other. In other words, the producers do not communicate with regards to the RDMA writes with immediate. The host channel adapter (510) is configured such that all RDMA writes with immediate are associated with the same combined completion queue (not shown). As an alternative, however, the host channel adapter (510) or the host (512) may be configured to create a virtual combined completion queue that is the logical combination of the completion queues of each producer.

Because of the combined completion queue, with each RDMA write with immediate received, the host channel adapter (510) increments the interrupt counter value for the combined completion queue. Thus, any combination of RDMA writes with immediate to the host (512) from the producer systems that total two hundred RDMA writes with immediate in any order results in a single interrupt to the receiving entity. Specifically, if producer M (not shown) executing on producer device M (506m) sends fifty RDMA writes with immediate, producer P (not shown) executing on producer device P (506p) sends eighty RDMA writes with immediate, and producer Q (not shown) executing on producer device Q (506m) sends seventy RDMA writes with immediate, then a single interrupt is triggered and the receiving entity processes the interrupt. Similarly, if after the interrupt, producer M sends two hundred RDMA writes with immediate, then a single interrupt is triggered and the receiving entity processes the interrupt. As shown, in one or more embodiments of the invention, any combination of RDMA writes with immediate that total two hundred, in the example, trigger the single interrupt. Accordingly, embodiments of the invention reduce the number of interrupts that are triggered for RDMA writes with immediate while at the same time providing for the combined effect of the number of RDMA writes with immediate exceeding the interrupt threshold value.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for issuing interrupts, the method comprising:
receiving, by a receiving communication adapter, a first remote directed memory access (RDMA) write with immediate from a first producer via a network;
identifying, by the receiving communication adapter, a completion queue descriptor corresponding to the first RDMA write with immediate, wherein the completion queue descriptor corresponds to a first receiving entity executing on a receiving device;
incrementing, by the receiving communication adapter, an interrupt counter value corresponding to the completion queue descriptor in response to the first RDMA write with immediate;
determining, after incrementing in response to the first RDMA write with immediate, that the interrupt counter value is less than a interrupt threshold value;
storing, by the receiving communication adapter, in response to the determination that the interrupt counter value is less than the interrupt threshold value, data in the first RDMA write with immediate on the receiving device without triggering an interrupt to the first receiving entity;
receiving, by the receiving communication adapter, a second RDMA write with immediate from a second producer via the network;
incrementing, by the receiving communication adapter, the interrupt counter value corresponding to the completion queue descriptor in response to the second RDMA write with immediate;
detecting, after incrementing in response to the second RDMA write with immediate, that the interrupt counter value exceeds the interrupt threshold value; and
triggering the interrupt to the first receiving entity in response to the interrupt counter value exceeding the interrupt threshold value, wherein the first receiving entity processes the first RDMA write with immediate and the second RDMA write with immediate in response to the interrupt.

2. The method of claim 1, further comprising:
identifying a first location in memory of the receiving device specified as a parameter in the first RDMA write with immediate;
performing the first RDMA write with immediate to the first location in memory of the receiving device;
identifying a second location in memory of the receiving device specified as a parameter in the second RDMA write with immediate; and
performing the second RDMA write with immediate to the second location in memory of the receiving device.

3. The method of claim 1, further comprising:
receiving, by the receiving communication adapter, a first message;
identifying, by the receiving communication adapter, a completion queue corresponding to the first message, wherein the first message is for a second receiving entity;
detecting, by the receiving communication adapter, a transition of the completion queue from empty to non-empty state;
triggering an interrupt to the second receiving entity based on detecting the transition;
receiving, by the receiving communication adapter, a second message;
identifying, by the receiving communication adapter, the completion queue as corresponding to the second message;
determining that the completion queue remains in non-empty state with the second message; and
completing processing the second message without triggering the interrupt to the second receiving entity based on the determination that the completion queue remains in non-empty state.

4. The method of claim 3, further comprising processing the second message, wherein processing the second message comprises:
obtaining at least one buffer descriptor from a receive queue corresponding to the completion queue; and
storing the second message in at least one buffer referenced by the at least one buffer descriptor.

5. The method of claim 1, wherein incrementing the interrupt counter value comprises:
performing, by the receiving communication adapter, a fetch and add operation on a predefined memory location on the receiving device, wherein the predefined memory location is specified by a completion queue corresponding to the completion queue descriptor.

6. The method of claim 5, wherein triggering the interrupt comprises:
sending, to an interrupt handler executing on the receiving device, a notification that to trigger the interrupt to the first receiving entity,
wherein the interrupt handler triggers the interrupt the first receiving entity.

7. The method of claim 5, wherein the receiving communication adapter detects that the interrupt counter value exceeds the interrupt threshold value and an interrupt handler triggers the interrupt.

8. The method of claim 1, wherein incrementing the interrupt counter value comprises:
performing a local add operation on a field of the completion queue descriptor, wherein the receiving communication adapter detects that the interrupt counter value exceeds the interrupt threshold value.

9. A system for issuing interrupts, the system comprising:
a receiving device comprising:
a first receiving entity; and
an interrupt handler; and
a receiving communication adapter operatively connected to the receiving device,
the receiving communication adapter comprising:
a network port connected to a network; and
an interrupt triggering module connected to the network port and configured to:
receive, from the network port, a first remote directed memory access (RDMA) write with immediate from a first producer via the network;
identify a completion queue descriptor corresponding to the first RDMA write with immediate, wherein the completion queue descriptor corresponds to the first receiving entity;
increment an interrupt counter value corresponding to the completion queue descriptor in response to the first RDMA write with immediate;
determine, after incrementing in response to the first RDMA write with immediate, that the interrupt counter value is less than an interrupt threshold value;
store in response to the determination that the interrupt counter value is less than the interrupt threshold value, data in the first RDMA write with immediate on the receiving device without triggering an interrupt to the first receiving entity;

receive a second RDMA write with immediate from a second producer via the network;

increment the interrupt counter value corresponding to the completion queue descriptor in response to the second RDMA write with immediate;

detect, after incrementing in response to the second RDMA write with immediate, that the interrupt counter value exceeds the interrupt threshold value; and trigger, using the interrupt handler, the interrupt to the first receiving entity in response to the interrupt counter value exceeding the interrupt threshold value, wherein the first receiving entity processes the first RDMA write with immediate and the second RDMA write with immediate in response to the interrupt.

10. The system of claim 9, wherein the receiving communication adapter further comprises a direct memory access (DMA) validation module configured to:

identify a first location in memory of the receiving device specified as a parameter in the first RDMA write with immediate;

perform the first RDMA write with immediate to the first location in memory of the receiving device;

identify a second location in memory of the receiving device specified as a parameter in the second RDMA write with immediate; and perform the second RDMA write with immediate to the second location in memory of the receiving device.

11. The system of claim 9, wherein the interrupt triggering module comprises a completion module, wherein the completion module comprises:

a completion module linked list queue comprising a completion queue; and a completion module handler, wherein the completion module handler is configured to:

receive a first message;

identify the completion queue as corresponding to the first message, wherein the first message is for a second receiving entity executing on the receiving device;

detect a transition of the completion queue from empty to non-empty state;

trigger an interrupt to the second receiving entity based on detecting the transition;

receive a second message;

identify the completion queue as corresponding to the second message; and determine that the completion queue remains in non-empty state with the second message, wherein the receiving communication adapter completes processing the second message without triggering the interrupt to the second receiving entity based on the determination that the completion queue remains in non-empty state.

12. The system of claim 11, wherein the receiving communication adapter further comprises:

a receive queue entry handler module configured to obtain at least one buffer descriptor from a receive queue corresponding to the completion queue; and a DMA validation module configured to:

store the second message in at least one buffer referenced by the at least one buffer descriptor.

13. The system of claim 9, wherein the interrupt triggering module comprises a completion module, wherein the completion module is configured to increment the interrupt counter value by:

performing a fetch and add operation on a predefined memory location on the receiving device, wherein the predefined memory location is specified by a completion queue corresponding to the completion queue descriptor.

14. The system of claim 13, wherein the completion module is configured to trigger the interrupt the first receiving entity by:

sending, to the interrupt handler, a notification that to trigger the interrupt to the first receiving entity, wherein the interrupt handler triggers the interrupt the first receiving entity.

15. The system of claim 9, wherein the interrupt triggering module comprises a descriptor fetch module, wherein the descriptor fetch module increments the interrupt counter value by:

performing a local add operation on a field of the completion queue descriptor, wherein the receiving communication adapter detects that the interrupt counter value exceeds the interrupt threshold value.

16. The system of claim 9, wherein the receiving device further comprises:

a receiving communication adapter device driver configured to translate communications between the interrupt triggering module and the interrupt handler.

17. A host channel adapter comprising:

a network port connected to a network;

a packet receiver module connected to the network port and configured to:

receive a first RDMA write with immediate from a first producer via the network port and the network; and a second RDMA write with immediate from a second producer via the network port and the network; and a descriptor fetch module connected to the packet receiver module and configured to:

identify a completion queue descriptor corresponding to the first RDMA write with immediate, wherein the completion queue descriptor corresponds to a first receiving entity executing on a receiving device;

increment an interrupt counter value corresponding to the completion queue descriptor in response to the first RDMA write with immediate;

determine that the interrupt counter value is less than an interrupt threshold value; and increment the interrupt counter value corresponding to the completion queue descriptor in response to the second RDMA write with immediate;

detect, after incrementing in response to the second RDMA write with immediate, that the interrupt counter value exceeds the interrupt threshold value; and trigger an interrupt to the first receiving entity in response to the interrupt counter value exceeding the interrupt threshold value, wherein the first receiving entity processes the first RDMA write with immediate and the second RDMA write with immediate in response to the interrupt.

18. The host channel adapter of claim 17, further comprising:

a DMA validation module configured to:

identify a first location in memory of the receiving device specified as a parameter in the first RDMA write with immediate;

perform the first RDMA write with immediate to the first location in memory of the receiving device;

identify a second location in memory of the receiving device specified as a parameter in the second RDMA write with immediate; and perform the second RDMA write with immediate to the second location in memory of the receiving device.

19. The host channel adapter of claim 17, further comprising:

a completion module comprising:

a completion module linked list queue comprising a completion queue; and a completion module handler, wherein the completion module handler is configured to:

receive a first message comprising a first plurality of packets;

identify the completion queue as corresponding to the first message, wherein the completion queue corresponds to a second receiving entity executing on the receiving device;

detect a transition of the completion queue from empty to non-empty state;

trigger an interrupt to the second receiving entity based on detecting the transition;

receive a second message comprising a second plurality of packets;

identify the completion queue as corresponding to the second message; and determine that the completion queue remains in non-empty state with the second message, wherein the host channel adapter completes processing the second plurality of packets without triggering the interrupt to the second receiving entity based on the determination that the completion queue remains in non-empty state.

20. The host channel adapter of claim 17, wherein the descriptor fetch module increments the interrupt counter value by:

performing a local add operation on a field of the completion queue descriptor, wherein the receiving communication adapter detects that the interrupt counter value exceeds the interrupt threshold value.

* * * * *

UNITED STATES PATENT AND TRADEMARK OFFICE
CERTIFICATE OF CORRECTION

PATENT NO. : 8,484,396 B2
APPLICATION NO. : 13/215390
DATED : July 9, 2013
INVENTOR(S) : Bugge Page 1 of 1

It is certified that error appears in the above-identified patent and that said Letters Patent is hereby corrected as shown below:

In the Specifications:

In column 4, line 10, delete "(10,)" and insert -- (104x), --, therefor.

In column 4, line 16, delete "(10,)" and insert -- (104x), --, therefor.

In column 4, line 32, delete "machines" and insert -- machines. --, therefor.

In the Claims:

In column 14, line 27, in Claim 6, delete "the" and insert -- to --, therefor.

In column 16, line 7, in Claim 14, delete "the" and insert -- to --, therefor.

In column 16, line 11, in Claim 14, delete "the" and insert -- to --, therefor.

Signed and Sealed this
Fifteenth Day of October, 2013

Teresa Stanek Rea
*Deputy Director of the United States Patent and Trademark Office*